(12) United States Patent
Tulloch

(10) Patent No.: US 12,330,780 B2
(45) Date of Patent: Jun. 17, 2025

(54) AIRCRAFT WING WITH FUEL TANK AND FUEL CELL

(71) Applicant: AIRBUS OPERATIONS LIMITED, Bristol (GB)

(72) Inventor: William Tulloch, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 0 days.

(21) Appl. No.: 18/547,661

(22) PCT Filed: Feb. 8, 2022

(86) PCT No.: PCT/GB2022/050330
§ 371 (c)(1),
(2) Date: Aug. 23, 2023

(87) PCT Pub. No.: WO2022/180355
PCT Pub. Date: Sep. 1, 2022

(65) Prior Publication Data
US 2024/0166331 A1   May 23, 2024

(30) Foreign Application Priority Data
Feb. 25, 2021 (GB) .................... 2102723

(51) Int. Cl.
*B64C 3/34* (2006.01)
*B64D 27/31* (2024.01)
(Continued)

(52) U.S. Cl.
CPC ............... *B64C 3/34* (2013.01); *B64D 27/31* (2024.01); *B64D 27/355* (2024.01);
(Continued)

(58) Field of Classification Search
CPC ........ B64C 3/34; B64D 27/31; B64D 27/355; B64D 37/04; B64D 37/30
See application file for complete search history.

(56) References Cited

U.S. PATENT DOCUMENTS

| 5,106,035 A | 4/1992 | Langford, III |
| 2005/0118952 A1* | 6/2005 | Cox ....................... B64D 27/24 455/67.11 |

(Continued)

FOREIGN PATENT DOCUMENTS

| CN | 207631504 U | 7/2018 |
| EP | 2848520 A1 | 3/2015 |
| FR | 3097202 A1 | 12/2020 |

OTHER PUBLICATIONS

Search Report for GB Application No. 2102723.0 dated Jul. 30, 2021, 4 pages.

*Primary Examiner* — Timothy D Collins
*Assistant Examiner* — Justin Michael Heston
(74) *Attorney, Agent, or Firm* — Nixon & Vanderhye P.C.

(57) ABSTRACT

An aircraft wing including: a wingbox; a fuel tank; a fuel cell system with a fuel cell; a fuel line configured to deliver fuel from the fuel tank to the fuel cell system; a propulsion system carried by the wingbox; and an electrical power line configured to deliver electrical power from the fuel cell system to the propulsion system. The fuel tank and the fuel cell system are located inside the wingbox, and the propulsion system is located outside the wingbox.

19 Claims, 2 Drawing Sheets

(51) Int. Cl.
*B64D 27/355* (2024.01)
*B64D 27/357* (2024.01)
*B64D 37/04* (2006.01)
*B64D 37/30* (2006.01)

(52) U.S. Cl.
CPC .......... *B64D 27/357* (2024.01); *B64D 37/04* (2013.01); *B64D 37/30* (2013.01); *B64D 2221/00* (2013.01)

(56) References Cited

U.S. PATENT DOCUMENTS

| | | | |
|---|---|---|---|
| 2018/0057142 A1* | 3/2018 | Wilkerson | F16B 37/044 |
| 2018/0305037 A1 | 10/2018 | Kooiman et al. | |
| 2022/0041299 A1* | 2/2022 | Wankewycz | B64D 27/24 |
| 2022/0204154 A1* | 6/2022 | Roe | B64C 29/0033 |

\* cited by examiner

AIRCRAFT WING WITH FUEL TANK AND FUEL CELL

RELATED APPLICATION

This application is the U.S. national phase of International Application PCT/GB2022/050330, filed Feb. 8, 2022 which designated the U.S. and claims priority to United Kingdom patent application GB 2102723.0, filed Feb. 25, 2021, the entire contents of each of which are hereby incorporated by reference.

FIELD OF THE INVENTION

The present invention relates to an aircraft wing with a fuel tank and a fuel cell.

BACKGROUND OF THE INVENTION

A hydrogen energy fixed-wing aircraft is described in CN207631504 (U). Hydrogen fuel tanks are suspended under the wings via pylons, and fuel cell stacks are provided in the wings.

SUMMARY OF THE INVENTION

A first aspect of the invention provides an aircraft wing comprising: a wingbox; a fuel tank; a fuel cell system comprising a fuel cell; a fuel line configured to deliver fuel from the fuel tank to the fuel cell system; a propulsion system carried by the wingbox; and an electrical power line configured to deliver electrical power from the fuel cell system to the propulsion system, wherein the fuel tank and the fuel cell system are located inside the wingbox, and the propulsion system is located outside the wingbox.

Optionally the fuel tank is a hydrogen fuel tank.

Optionally the propulsion system is suspended under the wingbox.

Optionally the fuel cell system further comprises a battery.

Optionally the propulsion system comprises a motor.

Optionally the propulsion system comprises a power control unit.

Optionally the propulsion system comprises a propeller.

Optionally the electrical power line is flexible.

Optionally the wingbox comprises an upper cover; a lower cover; a front spar and a rear spar.

Optionally the electrical power line passes through the front spar or the rear spar.

Optionally the propulsion system is carried by a pylon.

Optionally the fuel tank is cylindrical.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
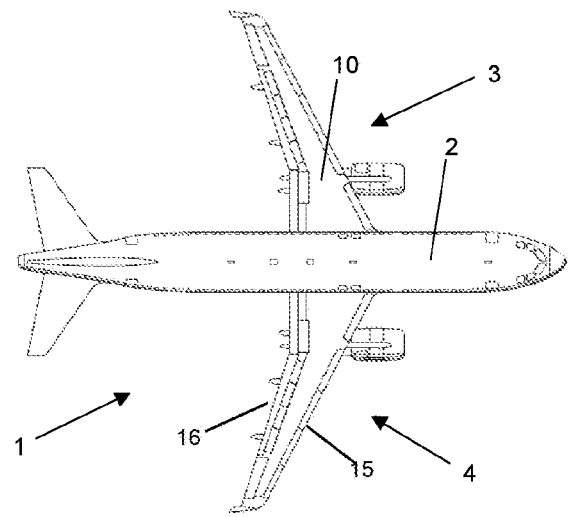
FIG. 1 is a plan view of an aircraft.
Figure 2:
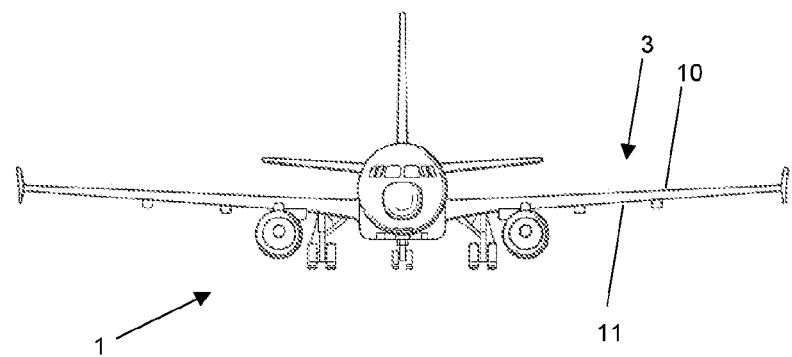
FIG. 2 is a front view of the aircraft of FIG. 1.

An aircraft 1 shown in FIGS. 1 and 2 comprises a fuselage 2 and a pair of wings 3, 4. Each wing comprises a wingbox 5, comprising an upper cover 10, a lower cover 11, a front spar 12, a rear spar 13, a leading edge 15 and a trailing edge 16.

Figure 3:
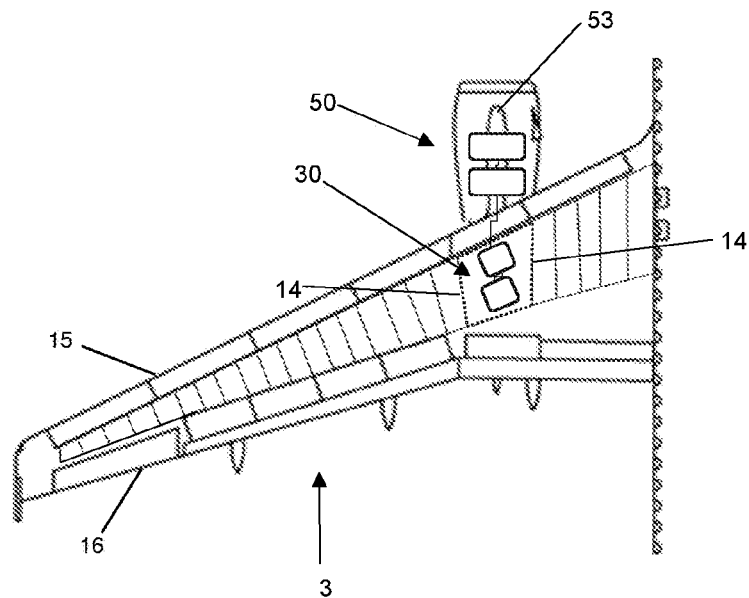
FIG. 3 is a plan view of the port wing showing the fuel cell system and propulsion system.
Figure 4:
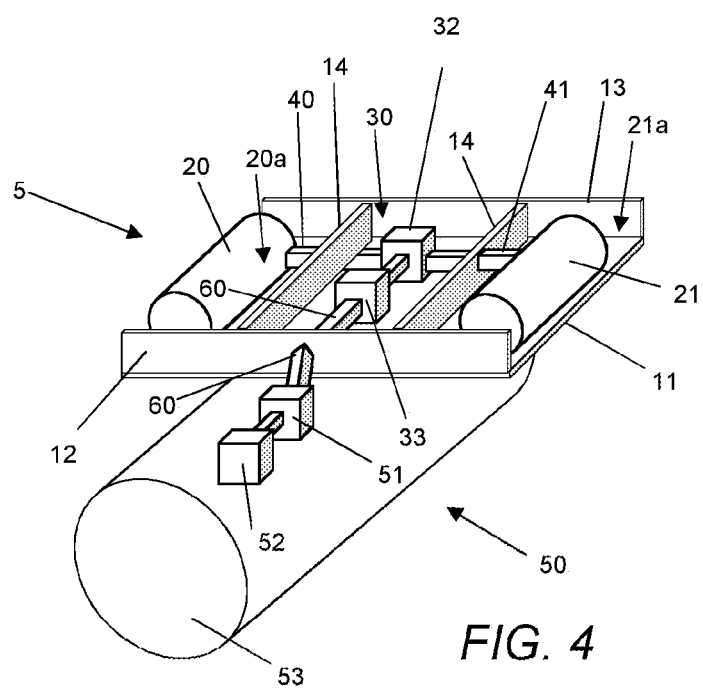
FIG. 4 is an isometric view of part of the wingbox with the upper cover removed.

The upper cover 10 is shown in FIG. 1, and part of the wingbox 5 is shown in FIG. 4 with the upper cover 10 removed to make the internal parts visible. FIG. 3 is a plan view of the port wing with various internal parts shown.

The wingbox 5 contains a plurality of ribs which divide the wingbox into bays. Each of the ribs is attached to both of the covers 10, 11 and to both of the spars 12, 13. Two of the ribs are labelled 14 and shown in FIG. 4.

A plurality of cylindrical hydrogen fuel tanks are located inside the wingbox 5. The fuel tanks are not shown FIG. 3, and FIG. 4 shows only two of the hydrogen fuel tanks 20, 21. In this example each fuel tank 20, 21 is located inside a respective bay 20a, 21a between a pair of ribs. The wingbox 5 may contain further hydrogen fuel tanks (not shown) each housed within a respective bay. In an alternative embodiment, the hydrogen fuel tanks may run in a spanwise direction, passing through the ribs.

In this example, the wingbox houses multiple fuel tanks 20, 21, but in an alternative embodiment it may house only a single fuel tank.

A fuel cell system 30 is also located inside the wingbox 5, in a bay between the pair of the ribs 14 shown in FIG. 4. The fuel cell system 30 comprises a fuel cell 32 and a battery 33. A first fuel line 40 is configured to deliver hydrogen fuel from the fuel tank 20 to the fuel cell system 30, and a second fuel line 41 is configured to deliver hydrogen fuel from the fuel tank 21 to the fuel cell system 30.

The fuel cell 32 is an electrochemical cell (or stack of cells) which converts chemical energy of the hydrogen fuel into electrical energy which is stored in the battery 33.

A propulsion system 50 is carried by the wingbox 5. As shown in FIG. 3, the propulsion system 50 is located outside the wingbox 5. The propulsion system 50 comprises a power control unit 51, a motor 52 and a shrouded propeller 54.

In this example the propulsion system 50 is suspended under the wingbox 5 by a pylon 53 shown in FIG. 3. In an alternative embodiment the propulsion system 50 may be located over the wingbox 5, or carried by the wingbox in any other position.

An electrical power line 60 is configured to deliver electrical power from the fuel cell system 30 to the propulsion system 50. A power control unit 51 is configured to receive electrical power from the battery, and a control input from the pilot, and output electrical power accordingly to the motor 52. The motor 52 is configured to convert the electrical power from the power control unit 51 into motion which it transmits to the propeller or turbine 54.

In this example the electrical power line 60 passes through the front spar 12, but in an alternative embodiment the electrical power line 60 may pass through the rear spar 13 or through any other part of the wingbox 5.

During flight of the aircraft 1, there may be a large amount of relative motion between the propulsion system 50 and the wingbox 5. The electrical power line 60 is flexible so that it can flex to accommodate this relative motion without being excessively damaged.

Locating the fuel cell system 30 inside the wingbox 5 means that the hydrogen fuel lines 40, 41 do not need to accommodate this relative motion.

In the example described above, the fuel tanks 20, 21 are hydrogen fuel tanks, but in other examples the fuel tanks may contain any other type of fuel which can be used by a fuel cell to convert chemical energy into electrical energy.

In summary, the embodiment of the invention described above provides an aircraft wing 3 comprising: a wingbox 5; one or more fuel tanks 20, 21; a fuel cell system 30 comprising a fuel cell 32; one or more fuel lines 40, 41 configured to deliver fuel from the fuel tanks to the fuel cell system; a propulsion system 50 carried by the wingbox 5; and an electrical power line 60 configured to deliver electrical power from the fuel cell system 30 to the propulsion system 50. The fuel tank(s) 20, 21 and the fuel cell system 30 are located inside the wingbox, and the propulsion system 50 is located outside the wingbox.

This arrangement has several advantages compared with CN207631504 (U). Firstly, it should be noted that the aircraft in CN207631504 (U) has a propeller mounted on the nose of its fuselage, but there is no disclosure of the propeller being driven by the fuel cell stacks. Thus a first advantage is that a propulsion system 50 is provided which is powered by electrical power from the fuel cell. Secondly, the hydrogen fuel lines between the fuel tanks and the fuel cells in CN207631504 (U) must accommodate relative motion between the wing and the fuel tanks suspended under the wing. A second advantage is that such motion does not need to be accommodated by the hydrogen fuel lines 40, 41, making them less prone to rupture. A third advantage is that by locating the fuel tank 20, 21 in the wingbox 5, it is less exposed to the risk of damage. A fourth advantage is that the wing-mounted propulsion system 50 is close to the fuel cell system 30, making the arrangement compact. The wing-mounted propulsion system 50 also provides various other advantages, such as improved flight handling and easier inspection or repair of the propulsion system 50 when the aircraft is on the ground.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. An aircraft wing comprising:
   a leading edge and a trailing edge;
   a front spar aft of the leading edge and a rear spar forward of the trailing edge, wherein the front spar and the rear spar extend spanwise along the aircraft wing;
   ribs each having a front edge attached to the front spar and a rear edge attached to the rear spar;
   a wingbox including the front spar and the rear spar, wherein the wingbox includes an upper cover and a lower cover spanning across the front spar and the rear spar;
   a fuel tank within the wingbox;
   a fuel cell system comprising a fuel cell;
   a fuel line configured to deliver fuel from the fuel tank to the fuel cell system;
   a propulsion system outside of the wingbox and carried by the wingbox, wherein the wingbox is aligned with the propulsion system along a vertical plane parallel to the rib nearest the fuel cell system; and
   an electrical power line configured to deliver electrical power from the fuel cell system to the propulsion system, wherein the electrical power line extends from the fuel cell system and towards the propulsion system.

2. The aircraft wing of claim 1, wherein the fuel tank comprises a hydrogen fuel tank.

3. The aircraft wing of claim 1, wherein the propulsion system is suspended under the wingbox.

4. The aircraft wing of claim 1, wherein the fuel cell system further comprises a battery.

5. The aircraft wing of claim 1, wherein the propulsion system comprises a motor.

6. The aircraft wing of claim 1, wherein the propulsion system comprises a power control system.

7. The aircraft wing of claim 1, wherein the propulsion system comprises a propeller.

8. The aircraft wing of claim 1, wherein the electrical power line is flexible.

9. The aircraft wing of claim 1, wherein the wingbox comprises an upper cover and a lower cover, wherein the upper cover forms an upper skin over the wingbox and the lower cover forms a lower skin over the wingbox.

10. The aircraft wing of claim 9, wherein the electrical power line passes through the front spar or the rear spar of the wingbox.

11. The aircraft wing of claim 1, wherein the propulsion system is carried by a pylon.

12. The aircraft wing of claim 1, wherein the fuel tank is cylindrical.

13. An aircraft wing comprising:
    a wingbox including a front spar and a rear spar, wherein the wingbox includes an upper cover and a lower cover spanning across the front spar and the rear spar;
    a fuel tank within the wingbox;
    a fuel cell system within the wingbox, wherein the fuel cell system includes a fuel cell configured to generate electrical power;
    a fuel line fluidically connected to the fuel tank and to the fuel cell system, and configured to deliver fuel from the fuel tank to the fuel cell system;
    an electric motor external to the wingbox and mounted to a pylon extending below the wingbox, wherein the electric motor is driven by the electrical power generated by the fuel cell and the electric motor drives a propeller or turbine configured to generate aerodynamic thrust for the aircraft wing, and
    an electric power line electrically connecting the fuel cell system to the electric motor propulsion system,
    wherein the fuel cell system, pylon and electric motor are aligned along a vertical plane parallel to a rib of the wingbox nearest the fuel cell system.

14. The aircraft wing of claim 13, wherein the wingbox includes a first rib and a second rib each extending between the front spar and the rear spar,
    wherein the fuel cell system is between the first rib and the second rib along a spanwise direction of the aircraft wing, and
    wherein the fuel tank is offset from both the first and second ribs towards a wingtip of the aircraft wing or a root of the aircraft wing, along a spanwise direction of the aircraft wing.

15. The aircraft wing of claim 13, wherein the wingbox includes a first rib and a second rib each extending between the front spar and the rear spar,
    wherein the fuel cell system is between the first rib and the second rib along a spanwise direction of the aircraft wing, and
    the fuel tank is a first fuel tank offset from the first and second ribs towards a wingtip of the aircraft wing, and the aircraft wing includes a second fuel tank within the wingbox, between the front and rear spar, and offset from the first and second ribs towards a root of the aircraft wing, wherein the second fuel tank is connected to fuel cell system via a second fuel line.

16. The aircraft wing of claim 15, wherein the root of the wing is configured to connect to a fuselage of an aircraft.

17. The aircraft wing of claim 13 wherein the fuel cell system includes a battery and the battery is electrically connected to the electric power line.

18. An aircraft comprising:
a fuselage;
a pair of wings wherein each wing extends outward from the fuselage in a spanwise direction of the wing,
wherein each of the wings includes:
  a wingbox including a front spar, a rear spar, ribs extending between the front and rear spars and an upper cover and a lower cover spanning across the front spar, the rear spar and the ribs, wherein the ribs include a first rib and a second rib adjacent to and offset from the first rib towards the fuselage along the spanwise direction,
  a fuel cell system comprising a fuel cell within the wingbox, between the front spar and the rear spar, and between the first and second ribs along the spanwise direction;
  a first fuel tank within the wingbox, between the front spar and the rear spar, and offset from the first rib towards a tip of the wing along the spanwise direction,
  a first fuel line connected to the first fuel tank and to the fuel cell system, and configured to deliver fuel from the first fuel tank to the fuel cell system, wherein the first fuel line extends through the first rib;
  a second fuel tank within the wingbox, between the front spar and the rear spar, and offset from the second rib towards the fuselage,
  a second fuel line connected to the first fuel tank and to the fuel cell system, and configured to deliver fuel from the second fuel tank to the fuel cell system, wherein the second fuel line extends through the second rib;
  a pylon mounted to the wingbox and extending below the wingbox;
  an electric motor external to the wingbox and mounted to the pylon, wherein the electric motor is driven by electrical power generated by the fuel cell and the electric motor drives a propeller or turbine configured to generate aerodynamic thrust for the aircraft, and
  an electric power line electrically connected to the fuel cell system and the electric motor propulsion system, and the electric power line is configured to deliver electric power from the fuel cell system to the electric motor propulsion system,
  wherein the fuel cell system, the pylon and the electric motor are aligned along a vertical plane parallel to the first rib.

19. The aircraft of claim 18, wherein the fuel cell system includes a battery and the battery is electrically connected to the electric power line.

* * * * *